(12) United States Patent
Kurjanowicz et al.

(10) Patent No.: US 10,452,298 B2
(45) Date of Patent: Oct. 22, 2019

(54) PORTABLE FILE-BACKED VIRTUAL STORAGE CLASS MEMORY

(71) Applicant: Microsoft Technology Licensing, LLC, Redmond, WA (US)

(72) Inventors: Matthew David Kurjanowicz, North Bend, WA (US); Attilio Mainetti, Bellevue, WA (US); Scott Chao-Chueh Lee, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 162 days.

(21) Appl. No.: 15/640,195

(22) Filed: Jun. 30, 2017

(65) Prior Publication Data
US 2018/0329643 A1 Nov. 15, 2018

Related U.S. Application Data (60) Provisional application No. 62/503,709, filed on May 9, 2017.

(51) Int. Cl.
| | |
|---|---|
| *G06F 3/00* | (2006.01) |
| *G06F 3/06* | (2006.01) |
| *G06F 9/455* | (2018.01) |
| *G06F 12/1009* | (2016.01) |

(52) U.S. Cl.
CPC .......... *G06F 3/0643* (2013.01); *G06F 3/0604* (2013.01); *G06F 3/0664* (2013.01); *G06F 3/0683* (2013.01); *G06F 9/45558* (2013.01); *G06F 9/45545* (2013.01); *G06F 12/1009* (2013.01); *G06F 2009/45579* (2013.01); *G06F 2009/45583* (2013.01)

(58) Field of Classification Search
None
See application file for complete search history.

(56) References Cited

U.S. PATENT DOCUMENTS

| | | |
|---|---|---|
| 8,769,535 B2 | 7/2014 | Mani |
| 8,850,593 B2 | 9/2014 | Brandt et al. |

(Continued)

FOREIGN PATENT DOCUMENTS

| | | |
|---|---|---|
| WO | 2015112126 A1 | 7/2015 |
| WO | 2016201589 A1 | 12/2016 |

OTHER PUBLICATIONS

Giles, Ellis R., "Containerizing Byte-Addressable NVM", In Journal of Parallel Data Storage & Data Intensive Scalable Computing Systems, Published on: Nov. 2016, 6 pages.

(Continued)

*Primary Examiner* — Midys Rojas
(74) *Attorney, Agent, or Firm* — Workman Nydegger (57) ABSTRACT

Reading and copying data as file data in a persistent memory storage device. A method may be practiced in a virtual machine environment. The virtual machine environment includes a persistent memory storage device. The persistent memory storage device has the ability to appear as a memory device having available memory to a virtual machine on a host and as a file to the host. The method includes acts for copying data stored in the persistent memory storage device for a first virtual machine. The method includes the host reading data from the persistent memory storage device as file data. The method further includes the host writing the data from the persistent memory storage device as file data.

20 Claims, 3 Drawing Sheets

(56) References Cited

U.S. PATENT DOCUMENTS 9,218,140 B2 12/2015 Antony
2014/0372790 A1 12/2014 Antony

OTHER PUBLICATIONS

Liang, et al., "A Case for Virtualizing Persistent Memory", In Proceedings of the Seventh ACM Symposium on Cloud Computing, Oct. 5, 2016, pp. 126-140.
Hajnoczi, Stefan, "Applications of persistent memory in virtualization", In Proceedings of Free and Open Source Software Developers' European Meeting, Published on: Feb. 2017, pp. 1-20.
"International Search Report and Written Opinion Issued in PCT Application No. PCT/US18/028764", dated Jul. 18, 2018, 12 Pages.

PORTABLE FILE-BACKED VIRTUAL STORAGE CLASS MEMORY

CROSS-REFERENCE TO RELATED APPLICATIONS

This application claims the benefit of and priority to U.S. Provisional Patent Application Ser. No. 62/503,709 filed on May 9, 2017 and entitled "Portable Fil-Backed Virtual Storage Class Memory," which application is expressly incorporated herein by reference in its entirety.

BACKGROUND

Background and Relevant Art

Computers and computing systems have affected nearly every aspect of modern living. Computers are generally involved in work, recreation, healthcare, transportation, entertainment, household management, etc.

Some computing systems may be implemented using so called virtual machine technology. In particular, a virtual machine runs on a host machine where the host machine's physical resources are used to back the virtual resources of the virtual machine. Thus, for example, processing power on a physical machine can be used to implement virtual processors on a virtual machine. Memory on a physical machine may be used to implement memory on a virtual machine. Disk resources on a host physical machine may be used to implement virtual storage on a virtual machine.

Traditional virtual machines have used block based storage, addressed using Logical Block Addressing (LBA) for their persistent data needs. For example, such block base storage may include various drives such as hard drives and solid state drives. These traditional virtual devices have aimed to emulate traditional block based devices. Now that there is a new mode of underlying storage, byte addressable persistent memory. It would be useful to make full use of the new byte addressable persistent memory in virtual machine environments.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a virtual machine environment. The virtual machine environment includes a persistent memory storage device. The persistent memory storage device has the ability to appear as a memory device having available memory to a virtual machine on a host and as a file to the host. The method includes acts for copying data stored in the persistent memory storage device for a first virtual machine. The method includes the host reading data from the persistent memory storage device as file data. The method further includes the host writing the data from the persistent memory storage device as file data.

Another embodiment illustrated herein includes a method that may be practiced in a virtual machine environment. The virtual machine environment includes a persistent memory storage device, the persistent memory storage device has the ability to appear as a memory device having available memory to a virtual machine on a host and a file to the host.

The method includes acts for distributing common data across one or more virtual machines. The method includes the host accessing file data. The method further includes the host writing the file data to one or more persistent memory storage devices as file data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Traditional virtual machines have used block based storage, addressed using Logical Block Addressing (LBA) for their persistent data needs. These traditional virtual devices have aimed to emulate traditional block based devices, such as hard drives and/or solid state drives. Now that there is a new mode of underlying storage, byte addressable persistent memory, such as phase change memory, these types of devices are being emulated in virtual machines to take advantage of the high-speed and persistent nature of the storage.

Virtual persistent memory can be implemented as a virtual device that emulates physical persistent memory inside a virtual machine.

Some embodiments illustrated herein use files on an underlying physical storage substrate as a repository for the data presented to the virtual machine. These files provide benefits to the host administrator, just as the virtual disk files used for virtual block devices:

For example, host administrators can move these files to different physical persistent memory devices on the same or different machines using standard copy mechanisms.

Alternatively or additionally, host administrators can create a template file and copy that template file to multiple virtual machines using standard copy mechanisms.

Alternatively or additionally, host administrators can convert between file formats that support block based access and those that support virtual persistent memory access.

Alternatively or additionally, host administrators can present the contents of a virtual persistent memory device as a block device on the host (e.g., a loopback mount).

Alternatively or additionally, host administrators can sparsely allocate these files. Data on the underlying host substrate is only consumed when necessary and the underlying physical storage substrate can be overprovisioned.

Alternatively or additionally, hosts can react to bad blocks in the underlying storage substrate and prevent guest access to these bad blocks.

Alternatively or additionally, host administrators can create trees of differencing disks that are presented as virtual persistent memory devices.

Figure 1:
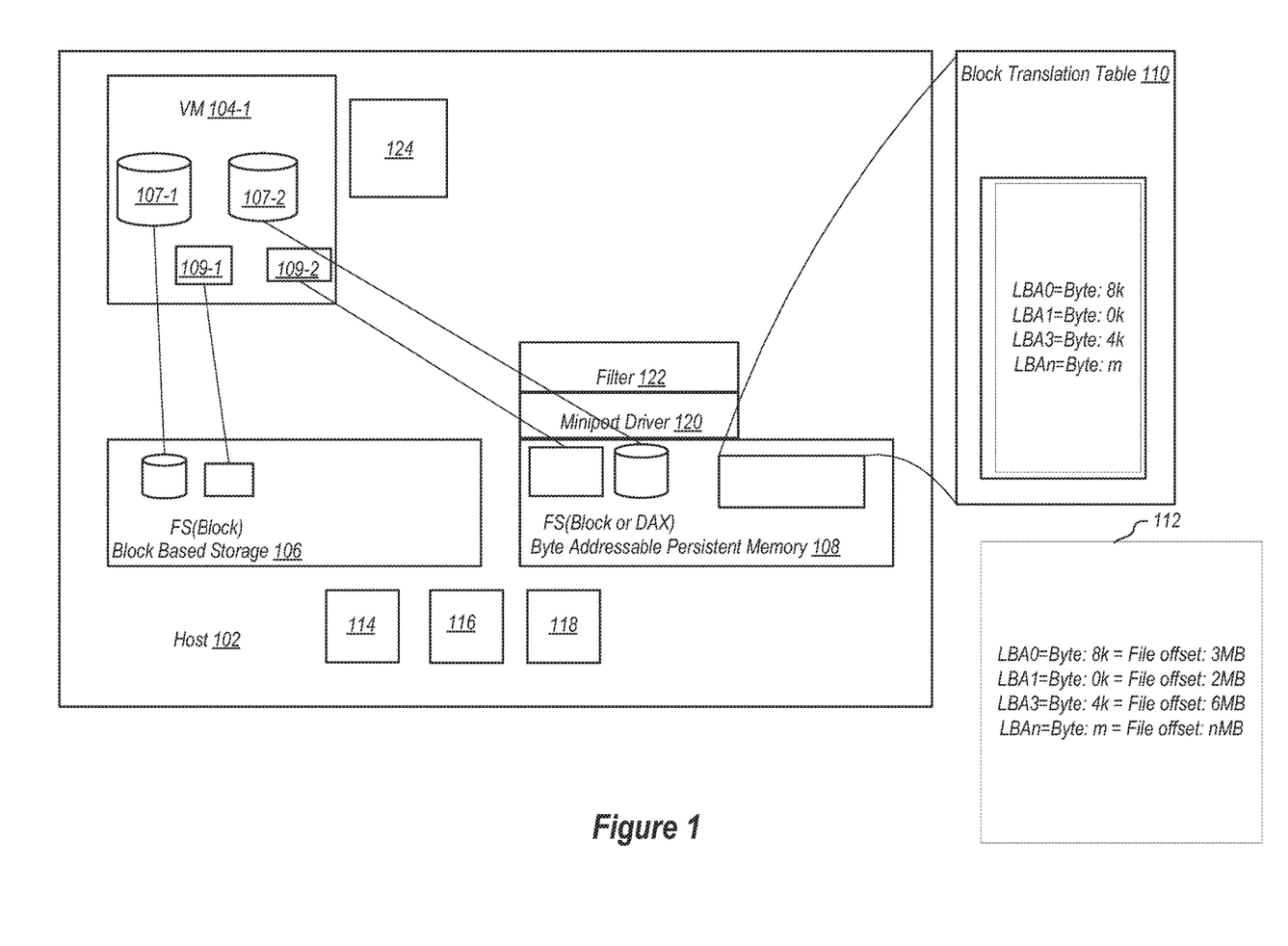
FIG. 1 illustrates a hosts machine having byte addressable persistent memory for use by guest virtual machines at the host machine.

Additional details are now illustrated. Reference is now made to FIG. 1 which illustrates a host 102. The host 102 is a physical machine which includes physical hardware and hosts one more virtual machines such as the virtual machine 104-1. Note that while a single virtual machine 104-1 is illustrated in the example, it should be appreciated that typically, a host will host multiple virtual machines. Indeed, many of the advantages of virtual machine technology are achieved when a host machine uses the resources of the host machine to implement multiple virtual machines. In the example illustrated in FIG. 1, the host 102 includes block based storage 106, and byte addressable persistent memory 108.

The block base storage 106 may be one or more block based devices, such as hard disks, solid state disks, and/or other block addressable storage devices. The block based storage 106 can be used to back certain elements of the virtual machine 104-1. That is, the block based storage 106 can be used as the physical hardware to implement one or more virtual devices. For example, block based storage 107-1 on the virtual machine 104-1 can be backed by the block based storage 106. Alternatively or additionally, the virtual machine 104-1 may have byte addressable storage 109-1, such as memory type storage, which is backed by the blocked based storage 106.

Additionally or alternatively, the virtual machine 104-1 may have block based storage 107-2 that is backed by the byte addressable persistent memory 108. The virtual machine 104-1 may have byte addressable storage 109-2 that is backed by the byte addressable persistent memory 108.

The byte addressable persistent memory 108 includes a Block Translation Table (BTT) 110, which provides sector atomicity support for byte addressable storage. In particular, the byte addressable persistent memory 108 is able to be addressed at byte granularity. However, as noted above, the byte addressable persistent memory 108 may be used to back block based storage. Thus, it is possible for a block based access to fail where the block contains some valid data and some invalid data. The BTT 110 provides sector atomicity support so that applications that rely on block based accesses can function appropriately. The BTT 110 is an indirection table that re-maps blocks on a volume. It functions as a file system that only provides atomic sector updates.

Embodiments may further implement a file translation table 112 which allows at least portions of the byte addressable persistent memory 108 to be read by the host 102 as a file such that the portions can be read and copied by the host 102 as if they were files. In particular, the file translation table 112 illustrated translates block offsets to virtual byte offsets and virtual byte offsets to file offsets needed to read and write data on the byte addressable persistent memory 108 as a file. Note that in some embodiments, a data structure may be maintained to translate virtual byte offsets to file offsets, and reuses the mapping in the BTT 110 for translating block offsets to virtual byte offsets.

These files are also specific to the persistent memory format of the byte addressable persistent memory 108. A file used to present virtual persistent memory to a virtual machine cannot ordinarily be used to similarly present block based storage to a virtual machine. OS storage stacks on persistent memory devices support a compatibility mode to allow atomic block-sized transactions on these devices. They achieve this by putting down an industry standard BTT 110, which describes logical block offsets <-> physical byte offsets. Ordinarily, this introduces a physical incompatibility between the persistent memory and block based storage stacks. However, using the file translation table described above, this can be overcome.

Embodiments illustrated herein take a file that was presented to a virtual machine and convert it to a format that can be presented to virtual machines as block storage, and vice versa using mapping such as that shown in the file translation table 112. Embodiments thus alleviate this physical incompatibility.

Further, some embodiments are implemented securely by using a locked down usermode process to convert the contents of the file. Alternatively or additionally, embodiments may be implemented where this locked down process is used to convert existing block file format types among themselves, such as between dynamic and fixed files, and between VHD (Virtual Hard Disc) and VHDX (Virtual Hard Disk Extended) files. The locked down usermode process is an additional security measure aimed at protecting against attacks that attempt to leverage security flaws in the parsing code by presenting intentionally malformed file contents to the parsing process. These attacks typically attempt to run arbitrary code in the security context of the target process. If the process is locked down, however, even if an attacker manages to trigger the arbitrary code execution, such code would not be able to gain access to other resources on the host, or to produce adverse effects on the host. The parsing process is typically locked down by running it within a security context that has minimal privileges on the host (e.g. cannot access any other file beside the file being converted, cannot execute operations requiring admin privileges, cannot access network resources, etc.).

Embodiments may alternatively or additionally allow the host to loopback mount one of these files that has been formatted as a virtual persistent memory compatibility file. This allows host administrators to mount and read data off the file, even if it was presented as a virtual persistent memory device to a virtual machine.

The following now illustrates one example conversion process.

Some of the compatibility problems between the virtual hard disk persistent memory (VHDPMEM) file and a virtual hard disk block capable file (VHD or VHDX) are:

The existence of the BTT table 110, and the implication that Logical Block Address (LBA) is not simply (LBA# * Block Size).

The existence of extra metadata that describes a virtual persistent memory device in the VHDPMEM file.

Therefore, embodiments may implement the following, or a similar, conversion routine to convert VHDPMEM→VHD(X):

1. User establishes a connection with the host's image management service 114. The image management service is a service that receives and executes requests for manipulating image files (e.g. VHD files) on behalf of possibly remote users. Typical requests include creating VHDs, converting VHDs, mounting VHDs, etc.

2. The image management service 114 opens handles to obtain the handles, to the source VHDPMEM file and the target VHD(X) file.

3. The image management service 114 spawns a new, locked-down user mode process 116 that can perform the conversion routine, passing these handles as parameters.

4. The locked down process 116 reads the raw contents of the VHDPMEM device, i.e., in this case the byte addressable persistent memory 108, translates the virtual byte offsets to logical block offsets in the file translation table 112 by respecting the BTT 110 stored on the byte addressable persistent memory 108.

5. The locked down process 116 exits.

6. The image management service 114 closes the handles and returns to the user.

Embodiments may implement the following conversion routine to convert VHD(X)→VHDPMEM:

1. User establishes a connection with the host's image management service 114.

2. The image management service 114 opens handles to the source VHD(X) file and the target VHDPMEM file.

3. The image management service 114 spawns a new, locked-down user mode process 118 that can perform the conversion routine, passing these handles as parameters.

4. The locked down process 118 initializes the BTT 110 on the VHDPMEM file.

5. The locked down process 118 reads the raw contents of the VHD(X) file and writes them to the VHDPMEM file, respecting the BTT 110 stored on the byte addressable persistent memory 108.

6. The locked down process 118 exits.

7. The image management service 114 closes the handles and returns to the user.

As discussed previously, some embodiments may implement a loopback mount of a filesystem. In particular, a loopback mounted filesystem is a virtual filesystem that provides an alternate path to an existing filesystem. Some embodiments illustrated herein facilitate the ability to implement a loopback mount using byte addressable persistent memory. The following illustrates one example of how loopback mount is implemented in this fashion.

Loopback mount on some operating system, such as Windows® available from Microsoft® Corporation of Redmond, Wash., requires a storage miniport driver 120 usable by a hypervisor that translates SCSI (or other appropriate protocol) requests directed to the virtual block addressable storage (e.g., block addressable storage 109-2) to those understood by the underlying adapter for the hardware, e.g., in this example, the byte addressable persistent memory 108. In Windows this is VHDMP, the VHD MiniPort which is a VHD parser and dependency provider. The example illustrated below uses the VHDMP, but is should be appreciated that in other embodiments, other appropriate miniport or other drivers may be alternatively or additionally used. Some embodiments include a filter 122 that sits on top of miniport driver 120 (or similar entity in other systems) that understands and performs translations of logical block addresses to actual virtual logical block devices (e.g., block addressable storage 109-2), based on the BTT 110 data. Using these translations, the filter 122 can be used to enable loopback mount using the operating system's native capabilities for doing so, by resolving any addressing incompatibilities.

The following illustrates details with respect to sparse allocation, thin provisioning, and/or host memory protections. Thin provisioning (i.e., overprovisioning) and sparse allocation can be used in virtualization systems to over-allocate physical resources such that the virtualization system appears to have more physical resources than it actually has. That is, the virtualization system that is thinly provisioned will have more virtual resources at a point in time than it has actual physical resources. However, not all virtual resources will be used at the same time, such that the physical resources are sufficient to back all of the virtual resources.

The VHDPMEM file format, and other formats in other systems, natively supports having regions that are not yet allocated and assigned. Many hypervisors, such as Hyper-V available from Microsoft® Corporation of Redmond, Wash., support memory intercepts. That is, a hypervisor can intercept memory operations from a virtual machine operating system to ensure that that operations are handled appropriately on the underlying hardware of the host. With this foundation, embodiments can implement overprovisioning mechanisms. The following illustrates an example:

1. VHDPMEM device created of size nGB, of which only several MB of data is actually allocated in the byte addressable persistent memory 108.
2. Before VM 104-1 starts, the hypervisor in host 102 allocates a region in a guest physical address map 124 for the entire nGB of virtual memory space.
3. On VM 104-1 start, the host 102 determines which VM ranges are allocated and maps those ranges (in the guest physical address map 124) into subsets of the virtual machine guest physical address space allocated in step (2).
4. When the guest VM 104-1 reads data from one of the non-mapped pages, the read completes with all zeroes.
5. When the guest VM 104-1 attempts to write to one of the non-mapped pages, the host 102 receives a memory intercept. In processing this intercept, the host 102:
    a. Allocates a new region in the VHDPMEM file and updates a table up front (the block allocation table).
    b. Instructs the hypervisor/virtualization infrastructure driver (a host driver primarily responsible for managing partitions and their assigned resources, such as memory, processors, etc.), to map this new region into the appropriate guest physical address space in the guest physical address map 124.
    c. Returns instruction back to the guest VM 104-1.
6. This region is now persistently allocated.

A similar mechanism can be used to unmap sub-regions of the file when the host determines that memory errors have occurred.

1. The host 102 is notified of memory errors.
2. The host 102 determines which file is impacted by said error message and the virtual offsets of this file. For example, this can be accomplished by referencing a data structure such as the file translation table 112.
3. The host 102 adds a memory intercept trigger to a process for accessing the block containing this region and kicks off a process to copy data in the block to a new location on the byte addressable persistent memory 108. The memory block can be larger than the bad memory regions on the device as the VHDPMEM file would allocate in large memory chunks. The bad memory region may span several allocation blocks. Each block is handled individually as below.

4. The host 102 informs the guest VM 104-1 that the memory region is now bad and should not be accessed after translating to a guest physical address.

5. If the guest VM 104-1 accesses the memory region that is known bad, the intercept trigger will cause the host 102 will issue a fault to the guest VM 104-1 without accessing the underlying physical memory (this prevents the host from bugchecking).

6. If there is enough data on the underlying storage substrate to move the remaining data in the allocation block to a new location:
   a. If the guest VM 104-1 reads data in the memory block that is being moved, the host 102 satisfies the read from the data already mapped to the guest VM 104-1.
   b. If the guest VM 104-1 writes data in the memory block that is being moved, the host 102 updates both the old and new locations before returning execution to the guest VM 104-1.

7. Once the salvageable data is moved to a new location on the host 102, the host 102 remaps the guest physical address range in the guest physical address map 124 to the new location and removes any additional memory intercepts triggers.

Note that the host takes care to not map known-bad regions into the guest VM 104-1.

Figure 2:
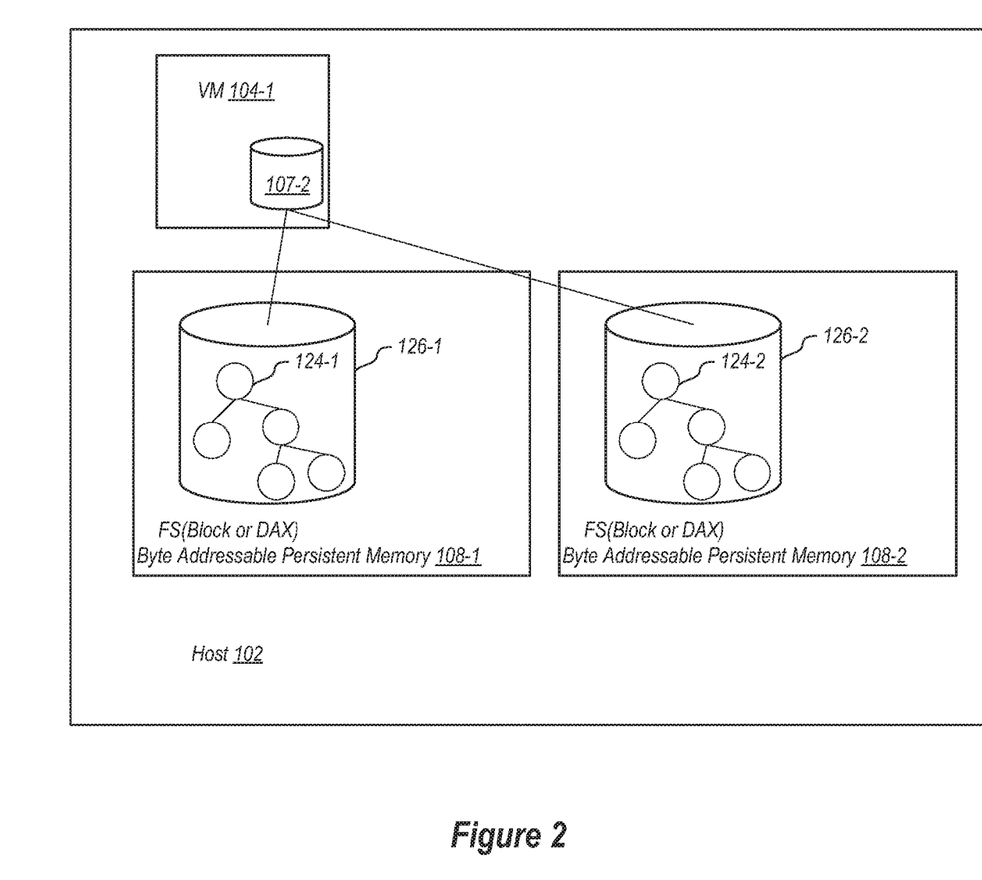
FIG. 2 illustrates a host machine having multiple byte addressable persistent memory devices.

Referring now to FIG. 2, the following illustrates how embodiments implement differencing functionality using virtual persistent memory disks. One common virtual storage technique is to create trees of differencing disks. A differencing disk has a parent and contains only data that is different from the parent. Virtual persistent memory devices implement similar functionality by using memory intercepts on write. FIG. 2 illustrates a tree 124-1 in a disk 126-1 of a first byte addressable persistent memory 108-1 and a tree 124-2 in a disk 126-2 of a second byte addressable persistent memory 108-2.

At VM power on time, the host 102 will traverse the tree of differencing disks to find the correct memory of a byte addressable persistent memory 108 to map into the guest VM 104-1 at any specific location. These maps, referred to generally as 124, could be of various granularities (i.e. embodiments may take only a few pages from one virtual persistent memory device (e.g., byte addressable persistent memory 108-1) and then many contiguous runs of pages from another virtual persistent memory device (e.g., byte addressable persistent memory 108-2).

The host 102 adds one or more memory intercept triggers so that data could be updated on write into the correct location. Note that writes always go to the leaf of the tree. Parent nodes are left unchanged as they will be needed for other differencing disk operations.

Note that while FIG. 2 illustrates differencing disks on the same machine, it should be appreciated that embodiments may be implemented in a cloud environment with multiple machines. Thus, various embodiments can read and write data as files from and to different persistent memory storage devices on the same or different machines.

A number of methods and method acts are illustrated herein. Although the method acts may be discussed in a certain order or illustrated in a flow chart as occurring in a particular order, no particular ordering is required unless specifically stated, or required because an act is dependent on another act being completed prior to the act being performed.

Figure 3:
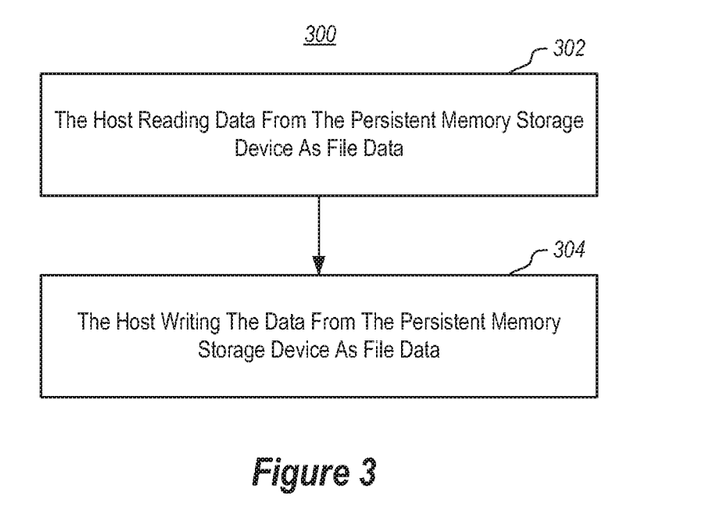
FIG. 3 illustrates a method of copying data stored in a persistent memory storage device for a virtual machine.

Referring now to FIG. 3, a method 300 is illustrated. The method 300 may be practiced in a virtual machine environment. The virtual machine environment includes a persistent memory storage device. The persistent memory storage device has the ability to appear as a memory device having available memory to a virtual machine on a host and as a file to the host. The method includes acts for copying data stored in the persistent memory storage device for a virtual machine.

The method 300 includes the host reading data from the persistent memory storage device as file data (act 302). For example, the host 102 may include a hypervisor that is configured to read data on the byte addressable persistent memory 108. The host 102 may read data on the byte addressable persistent memory 108 as file data by using a translation such as the translation table 112.

The method 300 further includes the host writing the data from the persistent memory storage device as file data (act 304).

The method 300 may further include a virtual machine reading the written data as data stored in a persistent memory device. For example, the virtual machine 104-1 may read the data written as file data in a native format for the byte addressable persistent memory 108.

The method 300 may further include a virtual machine reading the written data as block addressable data. Thus for example, as illustrated in figure one, the virtual machine 104-1 may be able to read data stored on the byte addressable persistent memory 108 as block addressable data. This allows the virtual machine 104-1 to implement the block based storage 107-2.

The method 300 may be practiced where the host reads the data from the persistent memory storage device as file data as a result of translating at least one of a block offset or a virtual byte offset to a file offset. As noted previously herein, this may be accomplished using a file translation data structure such as the file translation table 112 illustrated above.

The method 300 may be practiced where the host reading data from the persistent memory storage device as file data and the host writing the data from the persistent memory storage device as file data is performed by a locked down usermode process. For example, as illustrated above, and locked down process 116 may be used to perform various will read and write actions.

Figure 4:
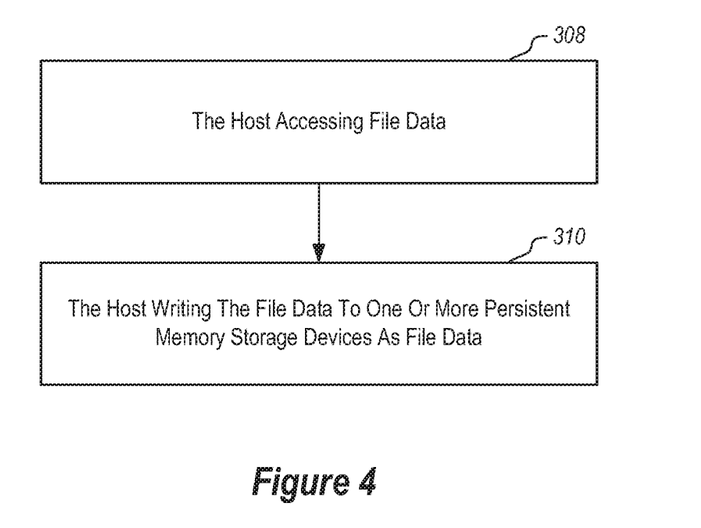
FIG. 4 illustrates a method of distributing common data across one or more virtual machines.

Referring now to figure four, a method 400 is illustrated. The method 400 may be practiced in a virtual machine environment. The virtual machine environment includes a persistent memory storage device. The persistent memory storage device has the ability to appear as a memory device having available memory to a virtual machine on a host and a file to the host. The method includes acts for distributing common data across one or more virtual machines.

The method 400 includes the host accessing file data (act 402).

The method 400 further includes the host writing the file data to one or more persistent memory storage devices as file data. This could be used, for example, for differencing disks as illustrated in the example shown in FIG. 2. Alternatively or additionally, this may be used to copy file data when one disk is implemented per virtual machine.

The method 400 may further include a virtual machine reading the written data as data in a persistent memory device.

The method 400 may further include a virtual machine reading the written data as block addressable data.

The method 400 may further include comprising mapping at least one of a block offset or a virtual byte offset to a file offset as a result of the host writing the data from the persistent memory storage device as file data. For example, embodiments may generate portions of the file translation table 112 illustrated above.

The method 400 may be practiced where the host writing the data from the persistent memory storage device as file data comprises the host writing disk data to a tree for a differencing disk. In some such embodiments the method 400 may further include adding one or more memory intercept triggers on the disk data such that guest virtual machine requests to write to the data will be intercepted by a hypervisor such that the writes are written to a leaf of the tree rather than to an existing parent node.

The method 400 may be practiced where the host accessing file data and the host writing the file data to one or more persistent memory storage devices as file data is performed by a locked down usermode process.

The method 400 may further include implementing a loopback mount by using a filter to translate at least one of a block offset or a virtual byte offset to a file offset to enable a miniport driver coupled to the filter to access the one or more persistent memory storage devices.

The method 400 may be practiced where the host writing the file data to one or more persistent memory storage devices as file data is performed as part of a thin provisioning process. In some such embodiments, the method may further include processing a memory intercept and mapping a byte addressable persistent memory location to a guest virtual machine physical address.

The method 400 may be practiced where the host accessing file data and the host writing the file data to one or more persistent memory storage devices as file data is performed as part of an error handling operation. In some such embodiments, the method 400 may further include adding a memory intercept trigger for a file and subsequently performing the acts of the host accessing file data and the host writing the file data to one or more persistent memory storage devices as file data to move file data to a new location on the one or more persistent memory storage devices.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
   one or more processors; and
   one or more computer-readable media having stored thereon instructions that are executable by the one or more processors to configure the computer system to present data backing a virtual persistent memory storage device to a virtual machine as block-based data to a host, including instructions that are executable to configure the computer system to perform at least the following:
      access file data from a first file, the file data being in a byte-addressable format that backs a virtual persistent memory storage device at a virtual machine; and
      convert the file data in the byte-addressable format used by the virtual persistent memory storage devices to a block-based format used by block-based storage and write the converted file data to a second file; and
      present the converted file data from the second file as a block-based storage device at the virtual machine.

2. The system of claim 1, further comprising instructions that are executable to configure the computer system to map at least one of a block offset or a virtual byte offset to a file offset as a result of the computer system converting the data from the byte-addressable format to the block-based format.

3. The system of claim 1, wherein the computer system converting the data from the byte-addressable format to the block-based format comprises the host writing disk data to a tree for a differencing disk, the method further comprising adding one or more memory intercept triggers on the disk data such that guest virtual machine requests to write to the data will be intercepted by a hypervisor such that the writes are written to a leaf of the tree rather than to an existing parent node.

4. The system of claim 1, further comprising instructions that are executable to configure the computer system to implement a loopback mount by using a filter to translate at least one of a block offset or a virtual byte offset to a file offset to enable a miniport driver coupled to the filter to access the one or more persistent memory storage devices.

5. The system of claim 1, wherein the computer system converting the file data from the byte-addressable format to the block-based format is performed as part of a thin provisioning process and wherein the method further includes processing a memory intercept and mapping a byte addressable persistent memory location to a guest virtual machine physical address.

6. The system of claim 1, wherein the host accessing file data and the computer system converting the file data from the byte-addressable format to the block-based format is performed as part of an error handling operation and wherein the method further includes adding a memory intercept trigger for a file and subsequently performing the acts of the host accessing file data and the host writing the file data to one or more persistent memory storage devices as file data to move file data to a new location on the one or more persistent memory storage devices.

7. In a virtual machine environment, the virtual machine environment comprising a persistent memory storage device, configured to present data backing the persistent memory storage device as a memory storage device to a virtual machine and as a block-based data to the host, a method of copying data stored in the virtual persistent memory storage device for a virtual machine:
   accessing file data from a first file, the file data being in a byte-addressable format that backs the virtual persistent memory storage device;
   converting the file data from the byte-addressable format used by the persistent memory storage device to a block-based format used by block-based storage and write the converted file data to a second file; and
   storing the converted file data from the second file into a block-based storage device.

8. The system of claim 7, further comprising a virtual machine reading data in the presented file data as data stored in a block-based storage device.

9. The system of claim 7, further comprising:
   accessing file data from the second file, the file data being in the block-based format;
   converting the file data from the block-based format to the byte-addressable format used by the virtual persistent memory storage device; and
   writing the converted file data into the virtual persistent memory storage device.

10. The system of claim 7, wherein the accessing the data from the persistent memory storage device as file data as a result of translating at least one of a block offset or a virtual byte offset to a file offset.

11. The system of claim 7, wherein the accessing data from the persistent memory storage device as file data and the converting the data from byte-addressable format to the block-based format is performed by a locked down user-mode process.

12. In a virtual machine environment, the virtual machine environment comprising a persistent memory storage device, configured to present data backing the persistent memory storage device as a memory storage device to a first virtual machine and block-based data to the host, a method of distributing common data across one or more virtual machines, the method comprising:
   accessing file data from a first file, the file data being in a byte-addressable format that backs the virtual persistent memory storage device; and
   converting the file data from the byte-addressable format used by the persistent memory storage devices to a block-based format used by block-based storage and write the converted file data to a second file; and
   presenting the converted file data from the second file as a block-based storage device to a second virtual machine.

13. The system of claim 12, further comprising reading data in the presented file data as data a stored in a block-based storage device.

14. The system of claim 12, further comprising:
   accessing file data from the second file, the file data being in the block-based format;

converting the file data from the block-based format to the byte-addressable format used by the virtual persistent memory storage device; and writing the converted file data into the virtual persistent memory storage device.

15. The system of claim 12, further comprising mapping at least one of a block offset or a virtual byte offset to a file offset as a result of the converting the data from the byte-addressable format to the block-based format.

16. The system of claim 12, wherein the converting the data from the byte-addressable format to the block-based format comprises the host writing disk data to a tree for a differencing disk, the method further comprising adding one or more memory intercept triggers on the disk data such that guest virtual machine requests to write to the data will be intercepted by a hypervisor such that the writes are written to a leaf of the tree rather than to an existing parent node.

17. The system of claim 12, wherein the accessing file data and the host converting the file data from the byte-addressable format to the block-based format is performed by a locked down usermode process.

18. The system of claim 12, further comprising implementing a loopback mount by using a filter to translate at least one of a block offset or a virtual byte offset to a file offset to enable a miniport driver coupled to the filter to access the one or more persistent memory storage devices.

19. The system of claim 12, wherein the converting the file data from the byte-addressable format to the block-based format is performed as part of a thin provisioning process and wherein the method further includes processing a memory intercept and mapping a byte addressable persistent memory location to a guest virtual machine physical address.

20. The system of claim 14, wherein the accessing file data and the host converting the file data from the byte-addressable format to the block-based format is performed as part of an error handling operation and wherein the method further includes adding a memory intercept trigger for a file and subsequently performing the acts of the host accessing file data and the host converting the file data between the byte-addressable format to the block-based format to move file data to a new location on another persistent memory storage devices.

* * * * *